United States Patent [19]

Jochimsen et al.

[11] Patent Number: 4,668,959

[45] Date of Patent: May 26, 1987

[54] MIST REDUCTION FOR INK JET PRINTERS

[75] Inventors: Dieter Jochimsen, Winchester; John A. Oberteuffer, Lexington, both of Mass.

[73] Assignee: Iris Graphics Inc., Stoneham, Mass.

[21] Appl. No.: 807,279

[22] Filed: Dec. 10, 1985

[51] Int. Cl.[4] .............................................. G01D 15/18

[52] U.S. Cl. ........................................ 346/1.1; 346/75

[58] Field of Search ........................ 346/1.1, 75, 140 R

[56] References Cited

U.S. PATENT DOCUMENTS

| | | | |
|---|---|---|---|
| 3,515,064 | 6/1970 | Vlier | 101/349 |
| 3,673,601 | 6/1972 | Hertz | 346/75 |
| 3,981,020 | 9/1976 | Takano et al. | 346/75 |
| 4,369,450 | 1/1983 | Iwagami et al. | 346/75 |

*Primary Examiner*—E. A. Goldberg
*Assistant Examiner*—Gerald E. Preston
*Attorney, Agent, or Firm*—Cesari & McKenna

[57] ABSTRACT

The present assembly is an ink jet printer of the continuous stream type for printing an image on a recording surface having a nozzle or orifice from which an electrically conductive ink stream is expelled by pressure along a predetermined path toward a recording surface apparatus to selectively deflect or interrupt portions of the ink stream such that the portions deflected or interrupt are prevented from reaching the area of the recording surface or which said image is printed, an ink mist shield positioned proximate to the recording surface, the mist shield being maintained at a first potential, apparatus for charging the recording surface to a second potential substantially different from the first potential whereby ink which impinges the recording surface is charged thereby and particles of the impinging ink which rebound from the recording surface are impelled toward the mist shield by the field resulting from the difference between the first and second potential.

The present method, for use in a continuous stream ink jet printer for printing an image on a recording surface having a nozzle or orifice and a recording surface, and a mist shield positioned proximate to the recording surface, is the steps of expelling by pressure a continuous stream of electrically conductive ink from the nozzle toward the recording surface, selectively deflecting or interrupt portions of the ink stream, applying an electrical charge to the recording surface, such that an electrical field exists between said mist shield and said recording surface whereby particles of the ink stream which rebound upon impact with the recording surface are urged toward the mist shield.

34 Claims, 1 Drawing Figure

MIST REDUCTION FOR INK JET PRINTERS

This Application is related to co-pending U.S. patent application of Dieter Jochimsen for AN INK JET PRINTER, Ser. No. 753,454, which is assigned to the same assignee as this Application.

This invention relates to the reduction of ink mist in an ink jet printing device. More particularly, it relates to a reduction of the mist that results from the shattering of ink droplets as they impinge on a recording surface.

BACKGROUND OF THE INVENTION

Ink jet recorders or printers have been the subject of an intense development effort for a number of years. The recorders fall generally into two categories, namely drop-on-demand and continuous stream types. The drop-on-demand ink jet printers in general emit an individual drop of ink as needed to form a print image. The present invention is applicable to the continuous stream type of recorder.

In general, a continuous stream ink jet printer pumps ink under high pressure through a restricted orifice or nozzle. The stream issuing from the nozzle separates into fine ink droplets, which are directed toward a recording medium, such as a paper sheet. The control of the ink stream to "paint" the recording surface is accomplished in several ways. In one variety of continuous stream printers, the ink jet passes into a deflection unit wherein portions of the ink jet, which are not intended to impinge the recording surface, are selectively deflected into a sump or gutter or towards non-critical areas of the medium, such as a margin, or even a member used to support the medium. The undiverted portions of the stream impact the recording medium and thereby "paint" the desired image on the medium. The deflection of the selected portions of the ink jet results in the creation of an ink mist. However, this mist and the resulting condensate can be substantially eliminated by means of pumps as disclosed in co-pending application Ser. No. 753,454. Another variety employs apparatus, such as a valve within the nozzle unit, which interrupts the stream flow to cause a break in the ink jet, while selectively permitting the ink stream to issue from the nozzle as needed.

Due to the high pressure used to expel the ink stream in continuous ink jet printers, the undiverted or uninterrupted droplets striking the recording medium impact with a considerable force. This impact causes the droplets to disintergrate. While most of the ink adheres to the medium, a significant amount rebounds from off the medium in the form of minute particles. This results in an ink mist adjacent to the recording surface.

This ink mist can, if not adequately dealt with, cause significant problems in the overall effectiveness and utility of an ink jet printer. Most importantly the mist causes problems with cleanliness and efficiency of operation. For example, a substantial portion of the mist condenses on the nozzle assembly. This results in increased maintenance expense. The ink mist may also become entrained in the ink stream droplets approaching the recording medium, thereby causing background coloration, particularly, in ink jet printers using multiple ink colors. There is also evidence that the ink mist may contaminate the atmosphere surrounding the printer, including areas external to a housing which is often used to contain the printer.

Prior attempts to solve the latter ink mist problem have included pump arrangements which are essentially designed to suck the ink mist directly from the atmosphere adjacent to the recording surface. These arrangements have not effectively eliminated the problem. Considerable ink still condenses throughout the printer, causing the aforementioned cleanliness and efficiency problems, as well as adversely effecting the quality of the printed image. Further, they have not eliminated the contamination of the work area around the ink jet printer. Moreover, the blowers necessary to accomplish this suction are expensive, require frequent filter replacement or cleaning and require excessive space in the printer.

Another solution disclosed in the co-pending application Ser. No. 753,454 comprises the charging of a mist shield positioned adjacent the recording surface to attract the uncharged, electrical conductive ink particles which rebounds from the recording surface. This also has not proven entirely satisfactory in that over time dust or other foreign matter builds upon the mist shield and the dust traps the rebounding ink mist in a manner where this ink mist interferes with the ink stream and also condenses on the dust particles and falls away into undesirable locations.

SUMMARY OF THE INVENTION

It is therefore an object of the invention to provide an improved ink jet printer characterised by the reduction of free ink mist resulting from impact of an ink jet on a recording medium.

Another object is to provide a printer of the above type in which the ink mist reduction is accomplished by simple apparatus that is easily incorporated, repaired, or replaced. It is also an object of the invention to provide a method for the reduction of free ink mist resulting from impact of an ink jet or a recording medium.

It is a further object to provide a printer of the above type in which the ink mist reduction is accomplished by simple apparatus which can be easily manufactured, is of low cost, and can be retrofitted to a variety of ink jet printers.

The present invention accordingly comprises the features of construction, combinations of element arrangements of parts, and the combinations of steps which will be exemplified in the construction hereinafter set forth, and the scope of the invention will be indicated in the claims.

BRIEF DESCRIPTION OF THE DRAWING

For a fuller understanding of the nature and objects of the invention, reference should be had to the following detailed description taken in connection with the accompanying drawing in which.

DETAILED DESCRIPTION OF THE PREFERRED EMBODIMENTS

Figure 1:
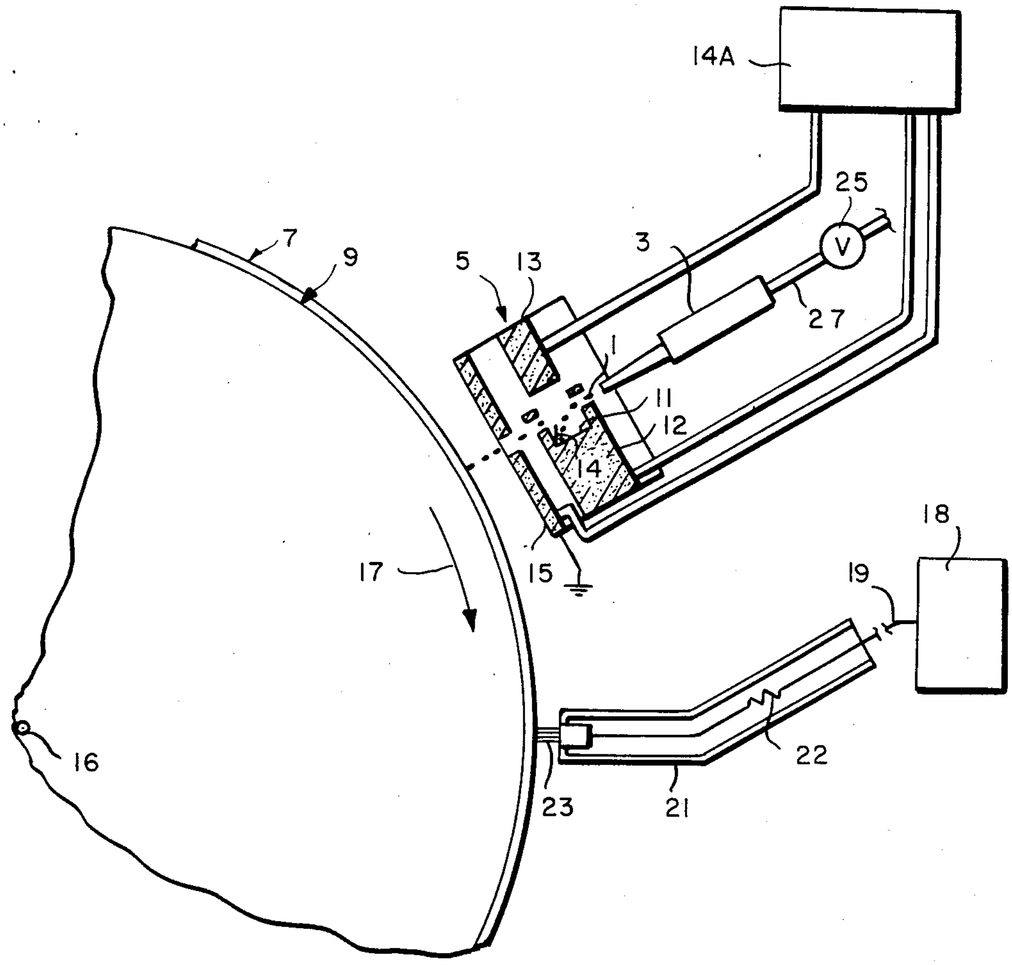
FIG. 1 is a schematic view of an ink-jet recorder embodying the present invention.

The application of the invention to an ink jet printer of the continuous stream type, which employs an electrical field to deflect portions of the ink stream, is shown in FIG. 1. An ink stream 1, composed of a conductive ink, is projected from a capillary nozzle unit 3 along a predetermined path through a deflection unit 5 and toward a recording surface 7 which, in the illustrated recorder, is the surface of a paper sheet wrapped around a rotary drum 9. On leaving the nozzle, the continuous ink stream 1 breaks up into discrete droplets.

Predetermined portions of the ink stream 1 are charged by application of an electrical charge to the nozzle unit 3 as described in U.S. patent application Ser. No. 753,454. In the deflective unit 5, the charged droplets are deflected downward into a gutter 11 in a control electrode 12 by an electric field applied between the control electrode 12 and a deflection electrode 13. A knife edge 14 is provided to further aid in directing the deflected segments of the ink stream 1 to the gutter 11. A suction pump 14A removes ink mist condensing on the deflection electrode 13 and the control electrode 12; it also removes the deflected ink from the gutter 11.

The uncharged segments of the ink stream 1 pass through the deflection unit 5 to the recording surface 7, printing an image thereon. An electrically conductive mist shield 15 is secured to the leading edge deflection unit 5 to assist in retaining ink mist formed in the deflection unit. In a departure from the system described in the co-pending application Ser. No. 753,454, the mist shield 15 is maintained at ground potential or at a potential substantially at ground, such that the shield has negligible attraction for dust particles. This avoids the undesirable buildup of dust previously encountered with mist shields maintained at a high potential relative to ground. The suction pump 14A also removes condensed ink from the mist shield.

The recording surface 7 rotates with the rotary drum 9 about a central axis 16 in a direction indicated by an arrow 17, while the nozzle unit 3 and deflection unit 5 move on a carriage (not shown) in a longitudinal direction relative to the recording surface, i.e. parallel to the axis 16. This causes the undeflected portions of the ink stream 1 to sweep over the recording surface in a raster type of operation.

The impact of the droplets of the ink stream 1 on the recording surface shatters the droplets. Portions of these shattered droplets rebound from the recording surface 7 to form an ink mist. It is this ink mist that is substantially eliminated by the present invention.

Specifically, an electrical charge from a high voltage source 18 is supplied to a conductor 19. The conductor 19 is positioned in an insulator tube 21 which is mounted on the carriage (not shown) with one end proximate to the recording surface 7. The conductor is connected to a resistor 22 which in turn is connected to an electrically conductive brush 23. The resistor 22 serves a current-limiting function for safety purposes. The brush 23, which is preferably formed of a material adapted for non-destructive, continuous contact with the recording surface 7 without excessive wear such as resilient plastic strips having a conductive coating, is mounted in the end of the tube 21 adjacent the surface 7, and the brush 23 contacts the surface 7.

An electric charge is continuously applied to the recording surface 7 through the brush 23 during the entire printing operation. Charge from the surface 7 is transferred to the impinging droplets. The ink particles rebounding from the surface as a result of impact are subjected to a strong electrostatic force by the electric field between the charged recording surface and the grounded mist shield 15. This force impels the particles toward the mist shield where they condense and are removed by the suction pump 14A. While the foregoing theory of operation may not be entirely correct or complete, the ink mist otherwise generated by the impact of the ink stream 1 with the recording surface 7 is substantially, if not entirely, eliminated by the invention.

It has been found that the application of a high voltage, e.g. between 1500 and 2500 volts, to the conductors 19 brings the recording surface 7 to a sufficiently high potential to effectively urge the ink mist toward the mist shield. The voltage is preferably approximately 2000 volts and may be of either polarity.

Since a relatively small current will charge each elemental area of the recording medium to a sufficiently high potential, the resistor 22 can have a high resistance, e.g. 2 megohms.

It will be appreciated that the drum 9 or the recording surface 7 or both must be a relatively good insulating member so that a charge may be maintained on the recording surface. The use of conductive inks allows the brush 23 to be positioned on the portion of recording surface 7 which has been printed on, with the ink serving as a conductor to the portion of the surface currently receiving ink. In that case, the position of the brush 23 on the surface is unimportant so long as the brush 23 contacts the inked surface in an area where the ink has dried sufficiently to avoid smudging or smearing.

In general, however the brush 23 is positioned to contact the unprinted portion of the recording surface 7, so as to avoid smudging of the ink by the brush 23. The brush should then be located fairly close to the area of impact of the ink jet 1 with the recording surface. This distance will usually be no more than 12 inches and preferably on the order of 4 inches. Thus, by the mounting of the tube 21 to the carriage, the brush 23 can be coursed over the recording surface at a predetermined distance ahead of the impact area of the ink jet 1.

It will be recognized and understood by those skilled in the art that the present invention, although described for simplicity with a single nozzle ink jet printer, has broad application to multijet recorders, including those using multiple ink colors.

It will be further recognized and understood by those skilled in the art that the present invention, although described in connection with an ink jet printer wherein portions of the ink stream are charged and then deflected in the deflection unit, has broad application to various varieties of continuous stream ink jet printers which employ apparatus for selectively defecting or interrupting portions of the ink stream. By way of example, in FIG. 1 the ink stream 1 is interrupted by selectively opening and closing a valve 25 in an ink supply line 27 which is connected to the nozzle 3 in which case the deflection unit 5 is unnecessary.

The invention disclosed herein thus provides an improved method and means to inhibit the buildup of free ink mist formed of rebounding ink particles when an ink stream strikes a recording surface. Moreover, the simplicity of the structure added to a printer facilitates its adaptation to various models of ink jet printers and recorders at low cost. Also, this structure is easily repaired or replaced by relatively unskilled personnel.

What is claimed as new and desired to be secured by Letters Patent of the United States is:

1. An ink jet printer of the continuous stream type for printing an image on a recording surface having a nozzle from which an electrically conductive ink stream is expelled by pressure along a predetermined path toward said recording surface, and a deflection unit having means for deflecting selected portions of said ink stream from said predetermined path such that said selected portions are prevented from reaching an area on said recording surface whereon said image is printed, the printer further comprising an ink mist shield positioned proximate to said recording surface, means for maintaining said mist shield at a first potential, and means for charging the recording surface to a second potential substantially different from said first potential, whereby ink which impinges on said recording surface is charged thereby and particles of said ink which rebound from said recording surface are impelled toward said mist shield by the field resulting from the difference from said first and second potentials.

2. An ink jet recorder according to claim 1, wherein said mist shield is maintained at the first potential which is sufficiently low such that appreciable dust does not accumulate on said mist shield.

3. An ink jet recorder according to claim 2, wherein said charging means includes a high voltage source, an electrically conductive brush connected to said source and means for positioning said brush in contact with said recording surface to conduct charge between said source and said surface.

4. An ink jet recorder according to claim 3, wherein said mist shield is maintained at the first potential which is ground potential.

5. An ink jet recorder according to claim 4 further comprising suction means adapted to remove ink mist condensing on said mist shield.

6. An ink jet recorder according to claim 5, wherein said brush is positioned in contact with the unprinted portion of said recording surface.

7. An ink jet recorder according to claim 6, wherein said potential supplied to said recording surface is between 1500 and 2500 volts with reference to ground.

8. An ink jet recorder according to claim 6, wherein said brush is composed of a resilient plastic with a conductive coating.

9. An ink jet printer of the continuous stream type for printing an image on a recording surface having a nozzle from which an electrically conductive ink stream is expelled by pressure along a predetermined path toward a recording surface, means for selectively charging portions of said ink stream, a deflection unit having means for deflecting the charged portions of said ink stream from said predetermined path such that said charged portions are prevented from reaching said recording surface, and means in the deflection unit for collecting and disposing of substantially all of any ink mist formed by the deflection of the charged portions of said ink stream, the printer further comprising an ink mist shield positioned proximate to said recording surface, means for maintaining said mist shield at a first potential, and means for charging the recording surface to a second potential substantially different from said first potential, whereby ink which impinges on said recording surface is charged thereby and particles of said ink which rebound from said recording surface are impelled toward said mist shield by the field resulting from the difference from said first and second potentials.

10. An ink jet recorder according to claim 9, wherein said mist shield is maintained at the first potential which is sufficiently low such that appreciable dust does not accumulate on said mist shield.

11. An ink jet recorder according to claim 10, wherein said charging means includes a high voltage source, an electrically conductive brush connected to said source and means for positioning said brush in contact with said recording surface to conduct charge between said source and said surface.

12. An ink jet recorder according to claim 11, wherein said mist shield is maintained at the first potential which is ground potential.

13. An ink jet recorder according to claim 12 further comprising suction means adapted to remove ink mist condensing on said mist shield.

14. An ink jet recorder according to claim 13, wherein said brush is positioned in contact with the unprinted portion of said recording surface.

15. An ink jet recorder according to claim 14, wherein said potential supplied to said recording surface is between 1500 and 2500 volts with reference to ground.

16. An ink jet recorder according to claim 15, wherein said brush is composed of a resilient plastic with a conductive coating.

17. An ink jet recorder of the continuous stream type for printing an image on a recording surface having a nozzle from which an electrically conductive ink stream is expelled by pressure along a predetermined path toward the said recording surface, means for selectively interrupting said ink stream such that the interupted portions are prevented from reaching an area on said recording surface, whereon said image is printed, the printer further comprising an ink mist shield positioned proximate to said recording surface, means for maintaining said mist shield at a first potential, and means for charging the recording surface to a second potential substantially different from said first potential, whereby ink which impinges on said recording surface is charged thereby and particles of said ink which rebound from said recording surface are impelled toward said mist shield by the field resulting from the difference from said first and second potentials.

18. An ink jet recorder according to claim 17, wherein said mist shield is maintained at the first potential which is sufficiently low such that appreciable dust does not accumulate on said mist shield.

19. An ink jet recorder according to claim 18, wherein said charging means includes a high voltage source, an electrically conductive brush connected to said source and means for positioning said brush in contact with said recording surface to conduct charge between said source and said surface.

20. An ink jet recorder according to claim 19, wherein said mist shield is maintained at the first potential which is ground potential.

21. An ink jet recorder according to claim 20 further comprising suction means adapted to remove ink mist condensing on said mist shield.

22. An ink jet recorder according to claim 21, wherein said brush is positioned in contact with the unprinted portion of said recording surface.

23. An ink jet recorder according to claim 22, wherein said potential supplied to said recording surface is between 1500 and 2500 volts with reference to ground.

24. An ink jet recorder according to claim 23, wherein said brush is composed of a resilient plastic with a conductive coating.

25. A method for reducing ink mist from the region adjacent to a recording surface in a continuous stream ink jet printer having a nozzle, a deflection unit, a mist shield, and a recording surface, said method comprising the steps of expelling by pressure a continuous stream of an electrically conductive ink from said nozzle toward said recording surface, selectively deflecting portions of said ink stream while said ink stream is in said deflection unit, and applying an electrical charge to said recording surface, such that an electrical field exists between said mist shield and said recording surface whereby particles of said ink stream which rebound upon impact with said recording surface are urged toward said mist shield.

26. A method in accordance with claim 25, further comprising the step of maintaining said mist shield at a potential sufficient low such that dust does not buildup on said mist shield.

27. A method in accordance with claim 25, further comprising the steps of collecting ink mist on said mist shield and removing ink mist condensing on said mist shield.

28. A method in accordance with claim 27, wherein the step of maintaining said mist shield at a sufficient low potential includes grounding said mist shield.

29. A method in accordance with claim 27, wherein said step of applying an electrical charge includes the step of coursing an electrically conductive brush which is electrically connected to a high voltage source over said recording surface.

30. A method for reducing ink mist from the region adjacent to a recording surface in a continuous stream ink jet printer for printing an image on a recording surface having a nozzle, a recording surface, and a mist shield positioned proximate to said recording surface, said method comprising the steps of expelling by pressure a continuous stream of an electrically conductive ink from said nozzle toward said recording surface, selectively interrupting said ink stream whereby portions of said streams are prevented from reaching an area on said recording surface whereon said image is printed and applying an electrical charge to said recording surface, such that an electrical field exists between said mist shield and said recording surface whereby particles of said ink stream which rebound upon impact with said recording surface are urged toward said mist shield.

31. A method in accordance with claim 30, further comprising the step of maintaining said mist shield at a potential sufficient low such that dust does not buildup on said mist shield.

32. A method in accordance with claim 31, further comprising the steps of collecting ink mist on said mist shield and removing ink mist condensing on said mist shield.

33. A method in accordance with claim 32, wherein the step of maintaining said mist shield at a sufficient low potential includes grounding said mist shield.

34. A method in accordance with claim 32, wherein said step of applying an electrical charge includes the step of coursing an electrically conductive brush which is electrically connected to a high voltage source over said recording surface.

* * * * *